United States Patent [19]

Steinbatz

[11] 3,896,455
[45] July 22, 1975

[54] APPARATUS FOR CONTROLLING THE EXPOSURE OF PHOTOGRAPHIC FILM
[75] Inventor: Alfred Steinbatz, Vienna, Austria
[73] Assignee: C. Reichert Optische Werke AG, Vienna, Austria
[22] Filed: Nov. 29, 1973
[21] Appl. No.: 420,355

[30] Foreign Application Priority Data
Dec. 1, 1972  Austria ............................ 10218/72

[52] U.S. Cl. ...................... 354/24; 354/50; 354/60
[51] Int. Cl.² ..................... G03B 7/08; G03B 17/16
[58] Field of Search .......... 354/24, 50, 51, 60, 234, 354/258

[56] References Cited
UNITED STATES PATENTS
| | | | |
|---|---|---|---|
| 3,670,637 | 6/1972 | Mori et al. | 354/24 |
| 3,690,230 | 9/1972 | Mori et al. | 354/24 |
| 3,695,159 | 10/1972 | Mita | 354/60 |
| 3,703,130 | 11/1972 | Watanabe | 354/24 |
| 3,777,638 | 12/1973 | Yata et al. | 354/24 |

Primary Examiner—Joseph F. Peters, Jr.
Attorney, Agent, or Firm—Alan H. Spencer; William C. Nealon; H. R. Berkenstock Jr.

[57]  ABSTRACT

Conversion of the signal from a light detector to a logarithmic value and the addition of similarly converted predetermined signals representing camera format, film sensitivity, correction factors and the like which are combined with the logarithmic light signal to be used to operate a display device reporting exposure time and converted to an analog value to operate a camera shutter device for obtaining improved exposures. Apparatus which provides improved exposures by this method includes a light detector and a set of controls for predetermining the signal magnitude of condition factors such as camera format, film sensitivity, correction factors and the like; means for converting each of these signals to a logarithmic value; computing means to combine these signals to a logarithmic signal useful for the direct display of exposure time and analog conversion means to provide a signal useable to control a camera shutter device to provide an exposure time equivalent to the display exposure time.

2 Claims, 6 Drawing Figures

APPARATUS FOR CONTROLLING THE EXPOSURE OF PHOTOGRAPHIC FILM

BACKGROUND OF THE INVENTION

This invention pertains to a method for the determination of the exposure time for photographic pictures, preferably for photomicrography, in which the light flux incident on the film plane or a conjugated plane and each of the magnitudes influencing the exposure time, such as camera format, film sensitivity, and at least one correction factor are taken into account, and the exposure time is then determined and displayed.

Methods and devices have already been proposed which provide for charging a condensor with a current at a rate proportionate to the exposure intensity dominant in the film plane, to determine the resultant exposure time. This method, which in itself is a very simple one, has proven disadvantageous to the extent that the exposure times thus produced are not displayed, and consequently, no time corrections can be effected, based upon experience, which are necessary especially where long exposure times are involved.

Also, methods are known which propose to effect the correction of non-linear distortions of the characteristic curve of a light detector, for instance, by means of an exponential voltage-divider in which, through alteration of the auxiliary voltage with the light detector, the film sensitivity and also the diaphragm opening is taken into account. This method, however, only permits encompassing a deviation of the exposure time of ±2 exposure stages. Only through a corresponding diaphragm adjustment can synchronisation be made in the light flux actually present, and in the exposure time already set.

Methods also are known for the determination of the exposure time, where the light detector is arranged in the bridge branch such as the arm of a Wheatstone bridge, and the correct exposure time is achieved by balancing. This method is disadvantageous, to the extent that the light detector at different light values is traversed by large currents, and consequently has a large power loss elicited thereby; the system inertia and setting time, which result from changes which are uncontrollable and undesirable.

In addition to this, the highly sensitive Polaroid films, which are being more widely used, require an unusually accurate evaluation of the light sensitivity. The methods which are known are not equal to the high standards required, because essentially, the adjustment of the film sensitivity takes place only in substantial stages.

DESCRIPTION OF THE INVENTION

The present invention is based on the task of overcoming the disadvantages and deficiencies indicated hereinabove and to determine and directly display the exposure time, especially for photomicrography, due consideration being given to the illuminational intensity predominant in the given film plane, the given camera format $A$, the film sensitivity $F$, and a correction value $K$ to be considered if need be.

According to the present invention, in the initial step of the system, the output signal of a light detector is converted to a logarithmic value, as voltage or current, which is then amplified. Simultaneously, the preselected signals which influence the exposure time are converted to logarithmic values represented as voltages and are then added together with the respective appropriate signs (+ or −) whereupon when combined the logarithmic value of the light detector signal output voltage is produced which now corresponds to the exposure time, and permits direct analog or digital display of the exposure time.

By this procedure, logarithmic value of the output signal of the light detector, which corresponds to the light flux, causes it to become a function of the form $2^n$. This makes it possible, through alteration of the light flux by one exposure stage — a factor of 2 — for the output voltage to be changed by one voltage value $\Delta U$, which accurately corresponds to one exposure stage. Moreover, in so doing, it is possible, in an exceptionally simple manner, to represent all of the magnitudes of values determining the exposure time such as $A$, $F$, $K$, and $L$, through voltages which are picked up at variable resistances. These various voltage magnitudes are added by means of a computer, and the output voltage thus resulting from this computer is a value directly corresponding to the exposure time.

As known, the light flux incident on the film plane affects, as does the given camera format, the given film sensitivity; and any required correction determines the correct contrast or darkening of a film emulsion. If the exposure intensity is low, the incident light flux is slight, then a linear relationship of light flux to darkening of the emulsion no longer exists; rather, the measured exposure time becomes adjusted by means of a correction factor $K$ to provide an adjusted exposure time which is greater, by a given amount, than the exposure time emperically determined, and in such a manner also assures the correct contrast of the film emulsion. The exposure time $T$ is directly proportional to the image surface of the camera format, and any given required correction factor is inversely proportional to the incident light flux, as well as to the given film sensitivity. The exposure time $T$ may be represented by means of an equation as follows:

$$T = \frac{\text{camera format } A \cdot \text{correction factor } K \cdot B}{\text{light flux } L \cdot \text{film sensitivity } F}$$

in which $B$ represents a constant which serves for the setting the magnitude of the absolute value.

The voltage magnitudes influencing the exposure time T are now converted to logarithmic values giving the equation:

$\log T = \log B + \log A + \log K - \log L - \log F$,

Accordingly, the logarithmic values of these magnitudes, by the invention, produce the following function when converted to voltages U:

$U_T = U_B + U_A + U_K - U_L - U_F$.

In this equation, we have the following representations:

$U_T$ = voltage which corresponds to the exposure time, $U_B$ = constant voltage value, which serves for setting or balancing by the absolute value, $U_A$ = voltage which corresponds to the camera format, $U_L$ = voltage which corresponds to the light flux, $U_F$ = voltage which corresponds to the film sensitivity; and $U_K$ = voltage for the allowance of eventually required corrections.

$U_A$, $U_L$ and $U_F$ are voltages resulting from predetermined setting of corresponding controls which may be varied as necessary by the operator to suit the specific exposure condition and $U_K$ is a voltage resulting from a predetermined need to compensate.

The area to be comprised of the exposure time $T$ is now subdivided into exposure stages in which an exposure stage, for instance through a film sensitivity difference of 3 DIN can be determined as double or half the surface of the camera format, or alternatively, half or double the light flux.

In accordance with the invention, a voltage value of $\Delta U$ is equal to one exposure stage change.

Now, if one of the voltage magnitudes which influence the exposure time, for instance the film sensitivity, is changed by one exposure stage, then the voltage corresponding to this magnitude likewise changes, by a voltage difference $\Delta U$ corresponding to one exposure stage, and influences in such a manner the exposure time. If one of these magnitudes is changed by two or more, n, exposure stages, then the voltage differences resulting therefrom, which influence the exposure time, likewise amount to twice $\Delta U$ or as the case may be, $n \Delta U$. In such a manner, the possibility is afforded through a simple arithmetical addition of voltages $U$ or as the case may be, of voltage differences $\Delta U$, to produce the different voltage magnitudes influencing the exposure time, or the given change of these magnitudes, in order to obtain the correct exposure time and display the same.

A further advantage of the method according to the invention can be seen in the fact that the logarithmically represented output voltage, after its utilization for the display of exposure time, is converted to an analog value to control the shutter.

In a further development of the invention, a device for the implementation of the method according to the invention is characterized by at least one computer unit having several inputs for the reception of the output voltage of a light detector, which is followed by a logarithmic conversion stage and an amplifying stage if required, and a predetermined control signal which corresponds to the particular camera format, to the particular film sensitivity, as well as at least to one correction value. A display instrument is adapted to receive the logarithmic value from the computer to effect the direct display of the exposure time.

According to a further development of the invention, a succeeding stage is used to convert to analog voltage the logarithmic value following the display device to control the shutter timer.

BRIEF DESCRIPTION OF THE DRAWINGS AND PREFERRED EMBODIMENTS OF THE INVENTION

Further essential characteristics, as well as clarifications of the invention providing clearer understanding are adduced below, reference being made to the drawings.

Figure 5:
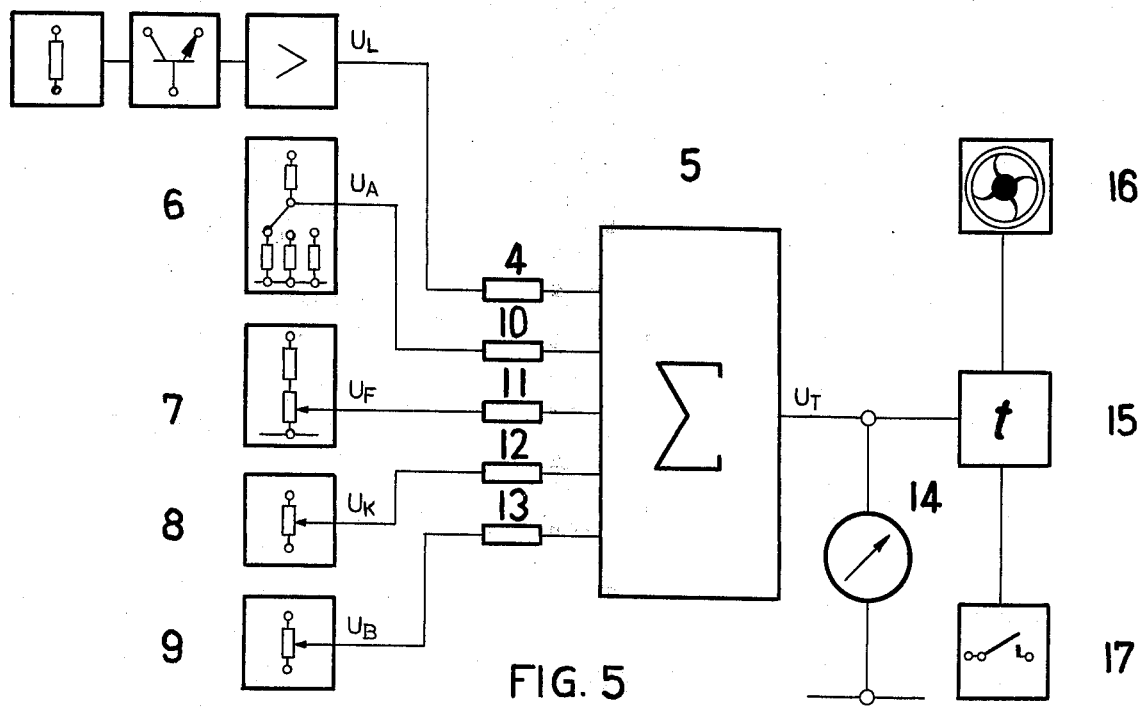
Figure 6:
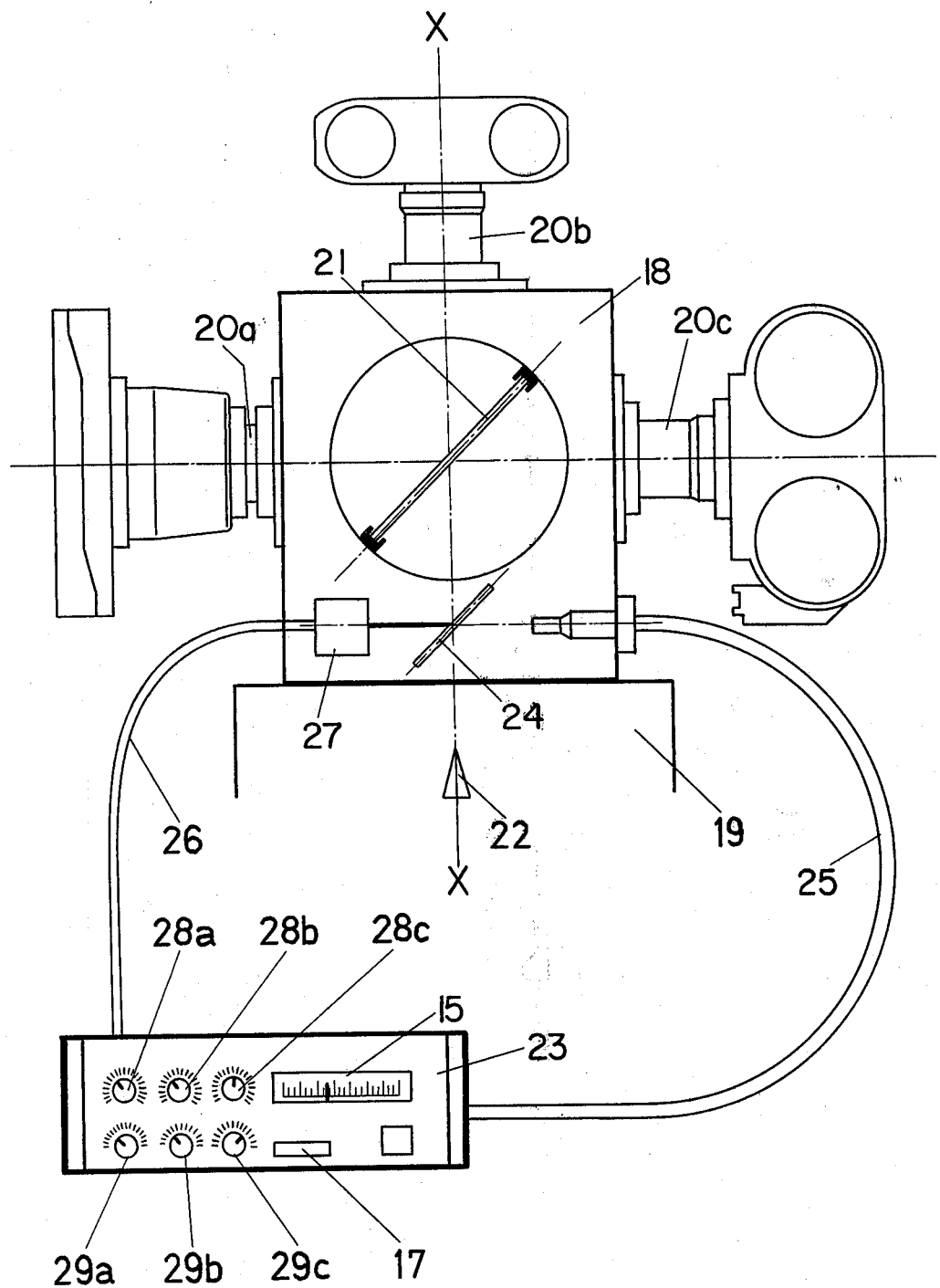

In FIG. 5, a block diagram of a device according to the invention is represented; and FIG. 6 shows apparatus of the invention for use in photomicrography.

Figure 1:
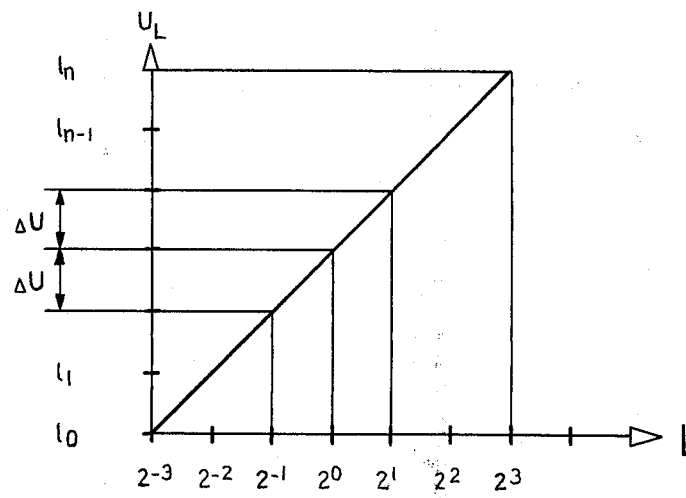
FIG. 1 shows the relationship between the voltage $U_L$ and the light flux $L$ to be measured.

According to the diagram shown in FIG. 1, the voltage $U_L$ corresponding to the given light flux, and the freely chosen light value stages $l_o - l_n$ linked with it are plotted in the linear scale along the ordinate, whereas the light flux $L$ is drawn along the abscissa, as L to the base 2. The curve resulting from the connection between the voltage $U_L$ and the light flux L to be measured, represents the function $U_L = c \cdot \log 2^l$, in which the light flux L is determined through the function $L = c_1 \cdot 2^l$.

In order to obtain this simple demonstration in an electrical or electronic manner, the output signal of the light detector, which is available as current or voltage, is brought by means of logarithming unit, and amplifying stage arranged in sequence to the latter, to the function $c \cdot \log 2^n$. By reference to the diagram, it can now be seen that by a modification — raising or lowering — of the light flux by the factor 2 or 0.5 ($= 2^{-1}$), the voltage $U_L$ likewise changes, and specifically, by one voltage value $\Delta U$.

Therefore, if, for instance, the light flux is raised by one exposure stage — that is, by the factor of 2 — then the exposure time is reduced by half ($-\Delta U$); if the light flux is reduced by one stage, then the exposure time is raised by one stage ($+ \Delta U$). The essential point to be seen here is that a voltage value $\Delta U$ is coordinated to a change by one exposure stage, whereby success is achieved in having all the remaining voltage magnitudes influencing the exposure time, become henceforth demonstrable in a simple manner.

Figure 2:
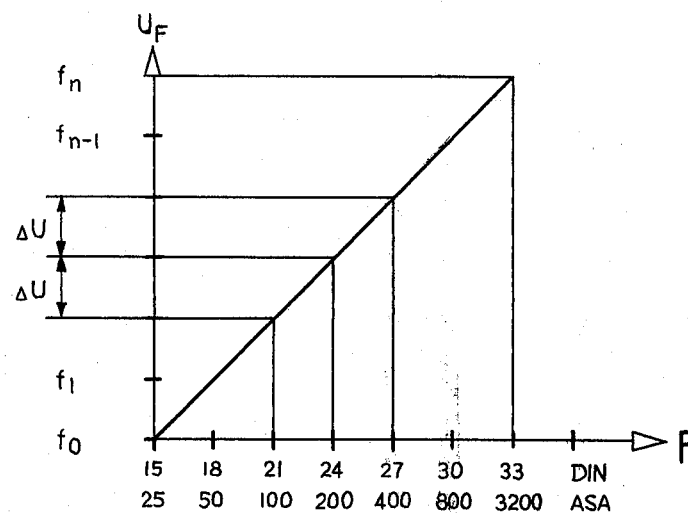
FIG. 2 shows the relationship between the voltage $U_F$ and the given or presumed film sensitivity $F$.

In FIG. 2, the relationship between the sensitivity F and the appertaining voltage $U_F$ is demonstrated. In the abscissa, the film sensitivity $F$ is subdivided in DIN and in ASA, and in the given film sensitivity, as well as the film sensitivity stages $fo - fn$ connected with it. The curve resulting therefrom corresponds to the equation $U_F = c \cdot \log 2^f$, in which the film sensitivity is determined through the equation $F = c_1 \cdot 2^f$.

The required exposure time is a function of the given film sensitivity present or selected, to the extent that with rising film sensitivity, the exposure time becomes shorter. If a highly sensitive film is now utilized, the film sensitivity is for instance higher by 3 DIN, and only half of that exposure time is therefore required, which a film having a film sensitivity reduced by 3 DIN would need. Hence a voltage value $\Delta U$ becomes coordinated to a difference in the film sensitivity of 3 DIN — that is, one exposure stage.

Figure 3:
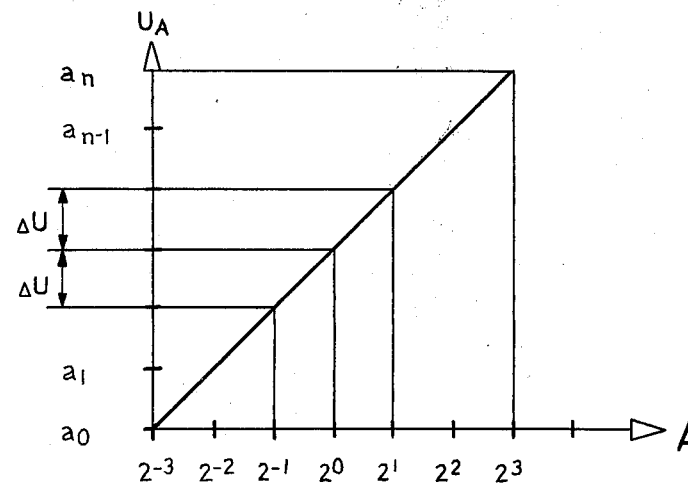
FIG. 3 shows the relationship between the voltage $U_A$ and the camera format $A$.

FIG. 3 shows the connection between the camera format A and the voltage $U_A$ corresponding to this format. In the abscissa, the camera format $A$ is plotted in logarithmic demonstration with base 2; the ordinate, on the other hand, shows the voltages $U_A$ or as the case may be, the camera format stages $a_0 - a_h$ corresponding to the given surfaces of the individual camera formats. The curve resulting therefrom represents the function $U_A = c \cdot \log 2^a$, in which the camera format $A$ is determined through the function $A = c_1 \cdot 2^a$.

If the given area of the camera format now becomes doubled, then the exposure time necessary for the perfect, correct exposure is also to be selected double as large; hence an exposure time results which is longer by one exposure stage. In so doing, it is again essential that a voltage value $\Delta U$ is coordinated to a camera format stage, so that on any alteration of the camera format, the corresponding voltage $U_A$ likewise changes, and specifically, by the corresponding value $\Delta U$.

For compensation of the "black screen" effect, a correction factor $K$ serves, which is demonstrated as corresponding voltages $U_K$. If it so happens that, due to the presence of slight illumination intensities, a corresponding lengthening of the exposure time is required, and specifically for instance by the factor of 2 or by one exposure stage, this takes place in such a way that the voltage $U_T$ present becomes increased by the voltage value $\Delta U$. However, if a lengthening of the exposure time by the factor of 4 is required, then the voltage value to be added to the voltage $U_T$ amounts to $2 \cdot \Delta U$.

If, on the other hand, the exposure time should be shortened by one stage, then this is allowed for by simple subtraction of the corresponding voltage value $\Delta U$ from the original voltage $U_T$ corresponding to the exposure time. In addition to this, it is necessary to be able to effect a balancing or adjustment of the absolute value, which can be achieved in a simple and uncomplicated manner by means of a corresponding voltage $U_B$. Now, if, according to the invention, the individual voltages which correspond to the voltage magnitudes influencing the exposure time, as well as the voltages corresponding to the correction values, are added together with the correct sign through a computer, then the output voltage of this computer now directly corresponds to the required exposure time.

Figure 4:
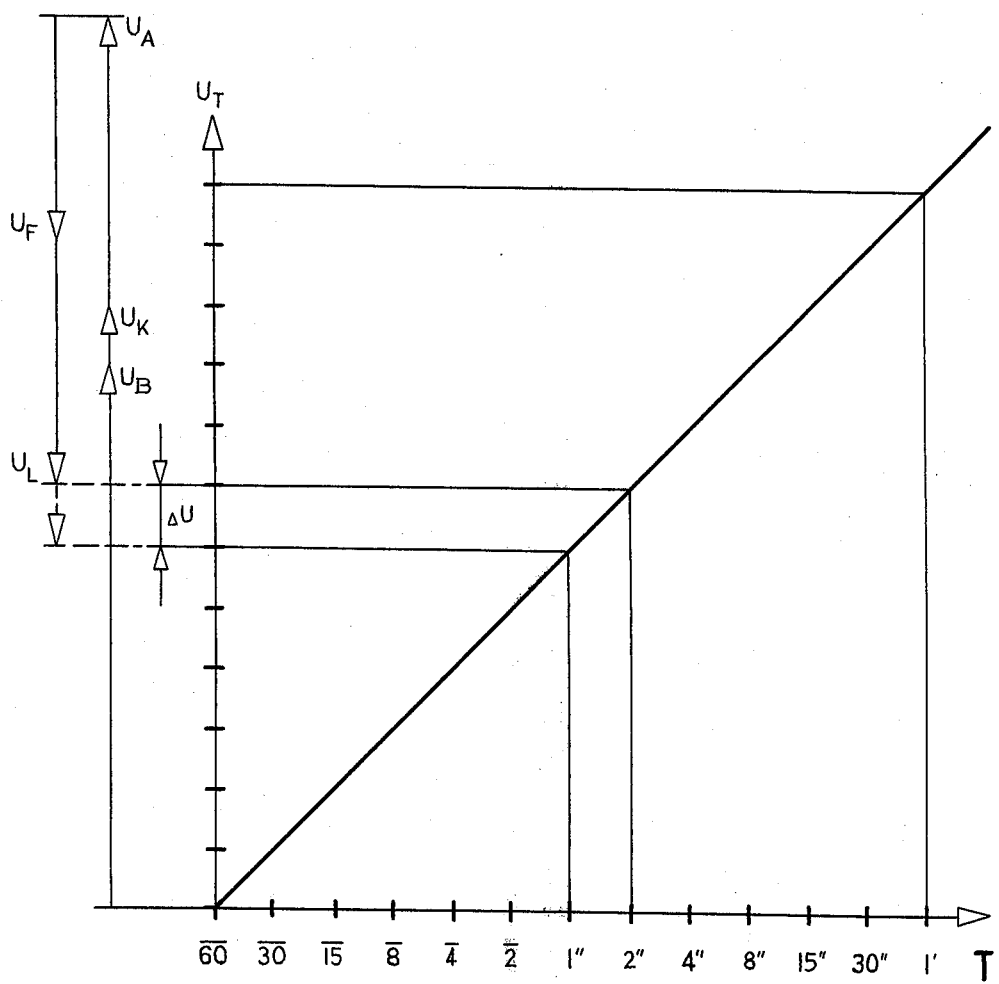
FIG. 4 represents the relationship between the voltage $U_T$ and the exposure time $T$.

If $c \cdot \log 2 = \Delta U$ is given for the term (equation), then it follows:

$U_L = c \cdot \log 2^l = l \cdot \Delta U$
$U_F = c \cdot \log 2^f = f \cdot \Delta U$
$U_A = c \cdot \log 2^a = a \cdot \Delta U$ The exposure time, expressed as voltage $U_T$, hence amounts to $U_T = U_B + U_K + a \cdot \Delta U - f \cdot \Delta U - l \Delta U$ or $U_T = U_B + U_K + \Delta U \cdot (a - f - l)$ as shown in FIG. 4, the connection is apparent between the voltage $U_T$ and the exposure time corresponding thereto.

The abscissa represents the exposure time, and along the ordinate the voltage $U_T$ corresponding to the given exposure time is plotted from the sum of the voltage magnitudes $U_B$, $U_K$, $U_A$, $U_F$, and $U_L$ which influence the exposure time.

Further, the diagram in FIG. 5 shows, for instance, an especially simple device for the implementation of the method according to the invention. Accordingly, a light detector 1 is provided which is subjected to light to be measured, and which as a function of brightness, yields a given output voltage magnitude. This output voltage is conducted to a logarithmic conversion unit 2, located next to the light detector 1, whereby the voltage is converted to a form $\log 2^n$. The signal, obtained in such a manner is thereafter amplified by amplifier 3 and conducted as voltage $U_L$ through an adding resistance 4 to the computer 5. Particular properties of the light detector is compensated for by variation of the degree of amplification in the amplifier 3. Mathematically, this requirement covered by the constant $c$ or $c_1$.

The additional voltage magnitudes used to influence the exposure time, such as camera format A, the film sensitivity F and the correction factor $K$ are controlled by variable resistances or resistance groups 6, 7, 8, 9 which can be, potentiometer, rotary switches or the like to produce preselected voltages $U_A$, $U_F$, $U_K$ and as the case may be, a balancing voltage $U_B$ which are conducted through the adding resistances 10, 11, 12 or 13 to the computer 5.

With respect to film sensitivity, it is decidedly advantageous to use a continuously variable resistance to modify the corresponding voltage whereby all intermediate values of the film sensitivity can be set simply and with great sensitivity. This produces the advantage that errors possibly cause large increment changes are eliminated.

In the computer 5, the voltage values are added with the appropriate sign to produce an output voltage $U_T$ corresponding directly to the exposure time $T$ and used to operate calibrated display device 14.

The output voltage $U_T$, from the computer 5, after its utilization for the exposure time display is conducted to a timer control 15 which converts the signal to an analog signal. The timer control 15 is connected to shutter 16 and with release 17 whereby the shutter mechanism of the shutter is opened, and after the proper exposure time, which is also displayed, the timer 15, closes the shutter automatically.

FIG. 6 is an exemplification of apparatus for use in photomicrography, and shows one example of the surprisingly versatile possibilities of application of the method of the present invention.

A housing 18 is constructed as a component, which may be directly attached to a microscope (not shown) by support 19, exhibits for instance three connectors 20a, 20b and 20c. Each of these conductors can link a separate camera and each camera can have a different format. Housing 18 supports a rotatable beam deflector 21 which alternatively directs the incident light from 22 to one of the cameras arranged on the connectors 20a, 20b or 20c. Beam deflector 21 can be either a mirror or prism and its movement can be direct manual, by remote control or electrically from a central control 23.

The arrangement of the cameras, however, does not have to be as represented; rather, it is possible to provide a connector only on the vertical outer surfaces of housing 18 so that beam deflector 21 can be permanently mounted and housing 18 can be rotated around a perpendicular central axis $x-x$: to bring the preselected camera into the working position. This rotational movement can likewise be effected either manually or by remote control.

Shutter 24 is preferably arranged in the optical path prior to beam deflector 21. The shutter can be constructed as a standard sectional shutter or as a swivelling mirror shutter and the latter has the advantage that, when in a closed position, the incident light is deflected directly on light detector and after determination of the required exposure time $T$, moves out of the ray-path for the duration of the exposure time $T$. The optical connection of the shutter 24 to the light detector 1, which may be located in the control unit 23 is accomplished by light conductor 25 which may be a conventional fiber optic conductor or the light detector 1 can be mounted in housing 18. In the latter case, the light detector 1 is electrically connected to the logarithmic conversion unit 2 likewise preferably located in control unit 23.

Control unit 23 also preferably contains timer 15 for controlling the swivelling mirror shutter 24 and which is connected by means 26 to adjustment device 27.

Light detector 1, logarithmic conversion unit 2, amplifier 3, resistances 6, 7, 8, 9, computer unit 5, display device 14, the timer 15 as well as the starter key button 17 may be arranged in a compact control unit 23 for the determination of the exposure time and for the control of the shutter.

The control unit 23 usually has a front panel which carries adjustments controls 28a, 28b, 28c connected the infinitely variable resistance 7 for preselecting the film sensitivity. Further, the adjustment controls 29a, 29b, 29c are arranged on this front panel for preselecting the different camera formats. Two of these different adjustment elements, for instance 28a and 29a may interact functionally in such a manner that a given film and the corresponding film sensitivity is adjusted at 28a, and the appertaining camera format at 29a the possibility is afforded by means of the elements 28a, 29a and 28b, 29b as well as 28c, 29c to simultaneously determine or set the voltage magnitudes determining the exposure time such as film sensitivity and camera format, for instance for three different cameras, and in this manner, to store this data for influencing the exposure time and avoid resetting of controls unless different cameras and/or films are substituted for those corresponding to the settings.

Now, if one shifts for instance, from a camera having highly-sensitive film to another camera having low-sensitive film, the corresponding camera is merely to be brought to the optical system by means of the beam deflector 21 and the appropriate data (voltage $U_A$ for camera format and $U_F$ for film sensitivity) corresponding to this camera or to this film are automatically utilized by the switching effected by the beam deflector 21 in computer 5.

What is claimed is:

1. A control for determining exposure time for photomicrographic apparatus and operating the shutter of said apparatus responsive to the influence of photographic environment such as camera format, film sensitivity and light flux comprising:

means for generating an electrical signal responsive to the light flux adjacent a photographic subject including means for detecting light adjacent said subject, means for generating an electrical signal proportional thereto and means for converting said electrical signal to a second electrical signal proportional to the value of an exponent of a predetermined base value of said light value;

means for generating an electric signal responsive to the format of said photographic apparatus including means for generating an electrical signal proportional to the value of an exponent of said predetermined base value of said format signal;

means for generating an electric signal responsive to the sensitivity of the film of said photographic apparatus including means for generating an electric signal proportional to the value of an exponent of said predetermined base value of said sensitivity signal;

means for generating an electric signal responsive to the change of sensitivity of the film of said photographic apparatus including means for generating an electric signal proportional to the value of an exponent of said predetermined base value of said change of sensitivity signal;

means electrically connected to said exponential electric signal generating means for summing said signals including means for generating an output electric signal proportional to said sum; and means for displaying the relative value of said output signal and means connected to said output signal and said shutter for driving said shutter responsive to said output signal.

2. A control according to claim 1 wherein the means for displaying a relative value of said output signal includes a visual display of exposure time.

* * * * *